US006834676B2

(12) United States Patent
Kulmann

(10) Patent No.: US 6,834,676 B2
(45) Date of Patent: Dec. 28, 2004

(54) PNEUMATIC SLIDE VALVE WITH SPLIT VALVE HOUSING OF PLASTIC

(75) Inventor: Erwin Kulmann, Markgröningon (DE)

(73) Assignee: Bosch Rexroth AG, Schwieberdingen (DE)

( * ) Notice: Subject to any disclaimer, the term of this patent is extended or adjusted under 35 U.S.C. 154(b) by 0 days.

(21) Appl. No.: 10/422,088

(22) Filed: Apr. 24, 2003

(65) Prior Publication Data

US 2003/0201020 A1 Oct. 30, 2003

(30) Foreign Application Priority Data

Apr. 26, 2002 (DE) .......................................... 102 18 759

(51) Int. Cl.⁷ .............................................. F15B 13/042
(52) U.S. Cl. .............................. 137/625.66; 137/625.69
(58) Field of Search ......................... 137/625.66, 625.69

(56) References Cited

FOREIGN PATENT DOCUMENTS

| DE | 41 05 130 A1 | 8/1992 |
|---|---|---|
| DE | 197 45 802 A1 | 4/1999 |
| DE | 197 48 345 A1 | 5/1999 |
| DE | 199 21 712 A1 | 11/2000 |
| DE | 199 53 746 C2 | 1/2001 |
| EP | 0 637 708 A1 | 2/1995 |
| JP | 10 184967 A | 7/1998 |

*Primary Examiner*—Gerald A. Michalsky
(74) *Attorney, Agent, or Firm*—Henry M. Feiereisen

(57) ABSTRACT

A pneumatic slide valve includes a valve housing made of injection-molded plastic material and having a valve bore and a plurality of external ports. The valve housing has an outer housing portion, made of reinforced plastic and determinative for a geometric outer dimension of the valve housing, and an inner housing portion made of non-reinforced plastic and extending continuously in the valve housing. The inner housing portion defines several pressure fluid compartments in fluid communication with the ports and the valve bore at least in a region which is positioned in the area of the pressure fluid compartments, wherein the outer housing portion is molded around the inner housing portion. A slide member is accommodated in the valve bore of the valve housing for displacement in the direction of the axis, for regulating a flow of compressed air between the ports.

18 Claims, 1 Drawing Sheet

PNEUMATIC SLIDE VALVE WITH SPLIT VALVE HOUSING OF PLASTIC

CROSS-REFERENCES TO RELATED APPLICATIONS

This application claims the priority of German Patent Application, Serial No. 102 18 759.2, filed Apr. 26, 2002, pursuant to 35 U.S.C. 119(a)–(d), the disclosure of which is incorporated herein by reference.

BACKGROUND OF THE INVENTION

The present invention relates, in general, to a pneumatic slide valve for regulating a flow or pressure fluid between various ports.

It is to be understood by persons skilled in the art that the term "slide valve" is used here in a generic sense and the principles described in the following description are equally applicable to valves which generally follow the concepts outlined here, such as, for example, piston valve, gate valve, directional control valve and the like. A typical pneumatic slide valve of a type involved here includes a valve housing which is made of injection-molded plastic material and has a valve bore for accommodating a slide member, also called valve spool, for displacement in axial direction, whereby the valve bore is interrupted by pressure fluid compartments which are disposed in spaced-apart relationship along the valve bore and are fluidly connected with outer ports of the valve housing. In general, the valve housing of pneumatic slide valves is either made of multiple parts or of single-piece configuration. Multipart valve housings are used to simplify assembly of components to be fitted in the valve housing and are normally split in the plane of the slide member, whereby both housing portions are connected to one another, after installation of internal valve components, through a screw connection and sealed against one another by an interposed housing seal. Pneumatic slide valves with such multipart valve housing are bulky with substantial dimension in width because of a need for a certain material thickness to provide a support surface for the housing seal.

On the other hand, there is an ever increasing demand on the manufacturers to produce pneumatic gate valves of smaller size because the provision of small single valves enables the production of an overall compact valve unit composed of a multiplicity of adjoining single valves. Therefore, the use of a single-piece valve housing is more and more desired as the overall width can hereby significantly be reduced, without causing an excessive decrease in throughflow of pressure fluid. However, single-piece valve housings must be re-finished by a complicated material cutting process, after their production through injection molding, especially as far as the interior valve bore for accommodation of the slide member is concerned. The finishing process of the valve bore involves the provision of a particularly smooth surface and the formation of various slanted run-on surfaces and rounded control edges.

German patent publication DE 197 45 802 A1 describes a single-piece valve housing including individual, pre-fabricated valve bushings which form the valve bore and are molded around with plastic material as the valve housing is injection molded. In order to secure the valve bushings in axial direction, each valve bushing is provided on its outer circumference with at least one ring-shaped groove or, at least in predetermined sections, with a ring-shaped bump, to effect a form-fitting engagement with the valve housing, after the valve housing is molded around the valve bushings. The valve bushings, which are made of metallic material, are placed into the injection mold before the injection molding process and held in place at the appropriate positions by rams. After injection molding, the valve bushings are secured in form-fitting relationship with the valve housing.

Although this approach may appear to be sound, practice has shown that when a multiway valve of this type is used over an extended period or exposed to extreme temperature fluctuations, a clearance between the valve bushings and the valve housing may form that adversely affects the operation of the gate valve. In extreme situations, the emergence of a gap may lead to an inadvertent migration of pressure fluid to an area between neighboring pressure fluid compartments. To tackle this problem, the arrangement of a sealing element in the form of an O-ring between the valve bushing and the valve housing has been proposed. However, as plastic material is molded around the valve bushings as the valve housing is injection-molded, the sealing elements are pushed out of the intended position so that the valve housing cannot be manufactured at reliable reproducibility. Furthermore, the use of valve bushings results in a great number of individual parts, thereby further complicating the manufacturing process of the valve housing.

It would therefore be desirable and advantageous to provide an improved pneumatic slide valve which obviates prior art shortcomings and which is reliable in operation even when subjected to extreme stress, while still allowing a production of the valve housing in a simple manner.

SUMMARY OF THE INVENTION

According to one aspect of the present invention, a pneumatic slide valve includes a valve housing made of injection-molded plastic material and having a valve bore and a plurality of external ports, wherein the valve housing has an outer housing portion, which is made of reinforced plastic and is determinative for a geometric outer dimension of the valve housing, and an inner housing portion, which is made of non-reinforced plastic and extends continuously within the valve housing to define a plurality of pressure fluid compartments in fluid communication with the ports and to define the valve bore at least in a region which is positioned in the area of the pressure fluid compartments, with the valve bore interrupted in axial direction by the pressure fluid compartments, wherein the outer housing portion is molded around the inner housing portion, and a slide member, accommodated in the valve bore of the valve housing for displacement in the direction of the axis, for regulating a flow of compressed air between the ports.

The present invention resolves prior art problems by enabling the use of materials for making the valve housing to best suit the mechanical demands on the valve housing. The running surfaces of the valve bore have a particularly high service life, as the inner housing portion is made of non-reinforced plastic which exhibits elasticity and superior surface quality and thus is especially suitable for application in connection with the mechanical demands upon the valve bore. On the other hand, as the outer housing portion, which encapsulates the inner housing portion, is made of reinforced plastic, the tendency for creepage is relatively low as a consequence of the fillers contained in the reinforced plastic. This fact is especially advantageous in conjunction with a securement of the valve housing to a carrier or securement of peripheral components of the slide valve to the valve housing. Compared to the conventional structure with several valve bushings for configuration of the valve bore through insert molding, the valve housing of the slide valve in accordance with the present invention is comprised of only two components. As the outer housing portion is molded around the inner housing portion, the securement of the inner housing portion within the injection mold becomes less complicated, when compared with the conventional approach to integrate several individual valve bushings.

As a result of the material union between the inner housing portion and the outer housing portion, the formation of gap between these two housing portions is precluded. The material union is realized directly during the encapsulation of the inner housing portion, i.e. in a same process step, and combined with a form-fitting connection. The tight material union can easily be implemented, when the materials of both housing portions to be connected have a same melting temperature. Thus, a detachment of the inner housing portion within the valve housing is positively prevented.

According to another feature of the present invention, passageways between the pressure fluid compartments and the ports are also formed, at least partially, by the inner housing portion. In this way, the material of the outer housing portion can more easily be molded around the inner housing portion. Moreover, compressed air flows in the valve only within the inner housing portion, so that sealing problems are no issue.

According to another feature of the present invention, the inner housing portion has opposite end faces which may each be constructed to form a protrusion of slighter material thickness for improving a connection between the inner and outer housing portions, when the outer housing portion is molded around the inner housing portion. Suitably, each of the end faces is inwardly recessed.

According to another feature of the present invention, the inner housing portion has an outer surface which is encapsulated in the outer housing portion and may be formed with projections of reduced material thickness for enhancing a material union with the outer housing portion. As a consequence of their small material thickness, these projections reach quickly their melting temperature during the encapsulation so that the desired material union can be reliably produced. Suitably, the projections are configured as spikes or lugs. Tests have shown that the projections are preferably tapered at an angle of 25° to 35°. Configuration of the projections on the outer surfaces of the inner housing portion ensure an additional stable form-fitting engagement between the inner and outer housing portions in combination with the material union so as to realize overall a connection of superior stability.

According to another feature of the present invention, the inner housing portion may be made of polyamide (PA), and the outer housing portion may be made of polyamide reinforced by 30 to 60% glass fibers. Tests have shown, that in particular glass fibers as filler provide the desired properties of the outer housing portion, as described above. Polyamide used for making the inner housing portion should not be reinforced with glass fibers because of the provision of a forced demolding or separation of the undercut-like feed geometry. Forced demolding with polyamide (PA) filled with glass fibers is not possible, when a sufficient feed geometry should be realized.

According to another feature of the present invention, those sections of the inner housing portion which are disposed in adjacent relationship to the pressure fluid compartments may be formed with slanted run-on surfaces and/or curved run-on surfaces, for interaction with sealing rings arranged on the outer surface of the slide member. These geometric relationships ensure a reliable guidance of the sealing rings of the slide member as the slide member moves back and forth.

According to another feature of the present invention, the two outermost sealing rings for sealing the outermost pressure fluid compartments with respect to the valve housing and the ambient atmosphere may cooperate with corresponding sections of the valve bore which are formed by the outer housing portion. Tests have shown that sealing rings at that location are not exposed to alternating loads and can reliably cooperate with the material of the outer housing portion, without encountering any leakage.

According to another feature of the present invention, the inner housing portion may cooperate with the outer housing portion via at least one radially outwardly located annular form-fitting joint. Hereby, the inner housing portion may be formed with at least one annular recess for form-fitting engagement with a complementary protuberance of the outer housing portion, or the inner housing portion may have at least one annular protuberance for form-fitting engagement with a complementary recess of the outer housing portion. The provision of such an interlocking form-fitting connection increases the resistance of the valve housing with respect to the axial load caused by the movement by the slide member.

The provision of an outer housing portion of plastic which is reinforced by glass fibers is especially suitable for application of a screw connection for mounting the valve housing to a corresponding plate-shaped manifold or base plate of a valve unit for distribution of compressed air. The glass fiber fraction in the plastic prevents material creepage, i.e. a slow plastic deformation when subjected to pressure. Suitably, the screw connection includes a screw fastener which is received in a through bore of the outer housing portion and is able to withstand the pressure in the valve housing.

According to another feature of the present invention, there may be provided at least one pilot valve which provides a pilot control and is mounted to the outer housing portion for axial displacement of the slide member through application of a control pressure in an associated pilot chamber of the valve housing. The slide valve according to the present invention may further include as peripheral component at least one cap element or the like for sealing at least one end side of the valve bore and/or formation of the pilot chamber at the outer housing portion. The attachment of the cap element can suitably be realized through provision of self-tapping screws which are screwed into the material of the outer valve portion.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
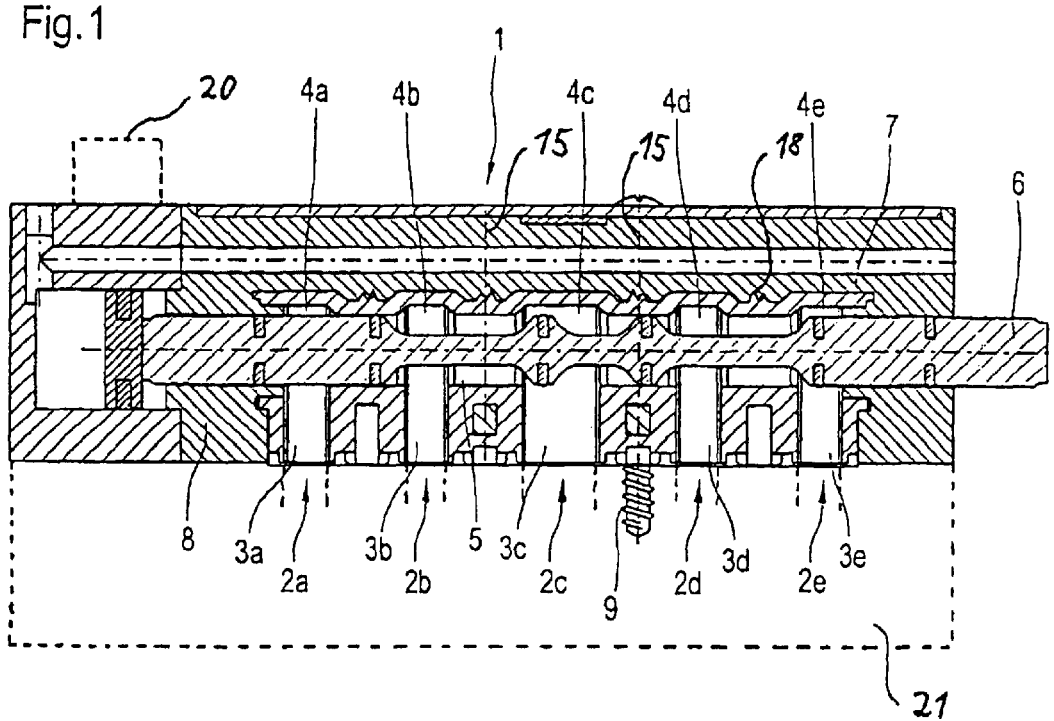
FIG. 1 is a side longitudinal section of a pneumatic slide valve according to the present invention with split valve housing.

Throughout all the Figures, same or corresponding elements are generally indicated by same reference numerals. These depicted embodiments are to be understood as illustrative of the invention and not as limiting in any way.

Turning now to the drawing, and in particular to FIG. 1, there is shown a side longitudinal section of a pneumatic slide valve according to the present invention, including a valve housing, generally designated by reference numeral 1 and formed with several external ports 2a, 2b, 2c, 2d, 2e, here five ports by way of example, which are disposed on one side, here lower side, of the valve housing 1, and provided for a pressure fluid, e.g. compressed air. In the non-limiting example of FIG. 1, port 2c may serve as central feed pressure port, whereas the neighboring ports 2b, 2d may serve as working ports. The outermost ports 2a, 2e may act as vent or ejecting ports. The ports 2a, 2b, 2c, 2d, 2e are respectively fluidly connected to internal pressure fluid compartments 4a, 4b, 4c, 4d, 4e via associated passageways 3a, 3b, 3c, 3d, 3e.

Extending interiorly along the valve housing 1 is a valve bore 5 in which a slide member or valve spool 6 is accommodated for movement in axial direction to thereby regulate a fluid flow between the ports 2a, 2b, 2c, 2d, 2e. The slide member 6 is axially displaceable via a generally known pilot control by means of a pilot valve 20, shown schematically by broken line in FIG. 1.

The valve housing 1 is comprised of an inner housing portion 7, which is made of a non-reinforced plastic, e.g. polyamide, and an outer housing portion 8, which is made of plastic reinforced with glass fiber, e.g. with a fraction of glass fiber of 30 to 60%, and molded around the inner housing portion 7. In the nonlimiting example of FIG. 1, the glass fiber reinforced fraction of the plastic amounts to 50%. The pressure fluid compartments 4a, 4b, 4c, 4d, 4e as well as the section of the valve bore extending in the area of the pressure fluid compartments 4a, 4b, 4c, 4d, 4e are hereby formed by the inner housing portion 7 which extends continuously within the valve housing 1. The passageways 3a, 3b, 3c, 3d, 3e up to the outermost ports 2a, 2e are also formed by the inner housing portion 7.

The valve bore 2 is closed on one end side of the valve housing 1 by a cap element 14. Several annular sealing rings 12 are provided in grooves on the outer surface of the slide member 6 for sealingly contacting against the inner wall surface of the inner housing portion 7, whereby the outermost sealing rings, designated here by reference numerals 12a, 12b, provide an airtight sealing against the outer housing portion 8.

Figure 2:
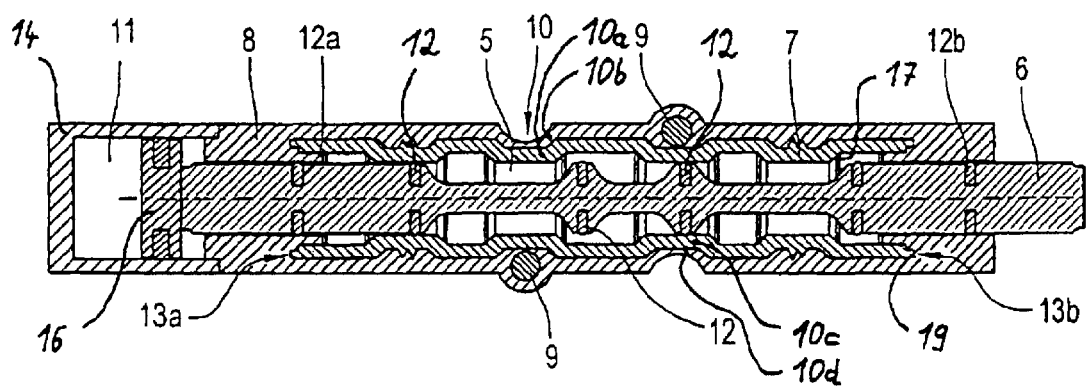
FIG. 2 is a longitudinal section through the valve housing of the slide valve of FIG. 1 in 90° rotated disposition.

The securement of the valve housing 1 to a compressed-air distributing manifold or base plate 21 of a valve unit (not shown) is realized by a suitable screw connection. Hereby, the outer housing portion 8 is provided with two through bores, indicated here for ease of illustration by dashdot lines 15 in diagonally offset disposition, as shown in FIG. 2, for receiving respective screw fasteners 9. The screw fasteners 9 are screwed into the manifold 21 which has passageways in correspondence with the ports 2a, 2b, 2c, 2d, 2e so as to provide a pressure fluid communication between the manifold 21 and the valve housing 1.

As shown in FIG. 2, the inner housing portion 7 and the outer housing portion 8 are connected to one another by a form-fitting joint, generally designated by reference numeral 10, to thereby increase the axial load-carrying capability of the connection between inner housing portion 7 and outer housing portion 8. The load in axial direction is generated by pressure fluid acting in pressure chamber 11 upon the slide member 6. The form-fitting connection may be implemented, as shown by way of example in FIG. 2, by providing the inner housing portion 7 with annular recesses 10a for engagement by annular protuberances 10b of the outer housing portion 8. Of course, it is also possible to provide the inner housing portion 7 with annular protuberances 10c and the outer housing portion 8 with annular recesses 10d for engagement by the protuberances to implement the form-fitting joint.

A control pressure is admitted into the pilot chamber 11 by the pilot valve 20 to act upon piston 16 in order to move the slide member 6 in axial direction. The return movement of the slide member 6 is realized by a return spring (not shown) in a manner generally known to the artisan. Those sections of the inner housing portion 7 which define the valve bore 5 are configured with slanted run-on surfaces and run-on radii 17 for optimizing an interaction with the sealing rings 12 on the slide member 6. As the inner housing portion 7 does not extend along the entire valve housing 1, the outer sealing rings 12a, 12b of the slide member 6 seal against the outer housing portion 8 which defines a continuation of the valve bore 5 on both end sides.

The connection between the outer housing portion 8 and the inner housing portion 7 can be improved by providing the inner housing portion 7 on the outer surface with spike-like or lug-like projections 18 which are disposed in opposition to the outer housing part 8 and taper at an angle of 25° to 35°, preferably 30°. The projections 18 also ensure a stable form-fitting engagement so that the valve housing 1 can be subjected to a highest degree of stress in axial direction.

In addition, the inner housing portion 7 has opposite end faces 13a, 13b which are each inwardly recessed to form a spike-like protrusion 19 of slighter material thickness. When the outer housing portion 8 is molded around the inner housing portion 7, these protrusions 19 fuse with the plastic material of the outer housing portion 8 to thereby provide an airtight sealing of the ports 2a, 2b, 2c, 2d, 2e to the outside.

The split valve housing 1 according to the present invention, which, after production, is of single-piece construction, can thus be made of materials to best suit the valve housing to different mechanical demands on defined zones of the valve housing.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A pneumatic slide valve, comprising:
a valve housing defining an axis and made of injection-molded plastic material, said valve housing having a valve bore and a plurality of external ports, said valve housing including an outer housing portion, which is made of reinforced plastic and is determinative for a geometric outer dimension of the valve housing, and an inner housing portion, which is made of non-reinforced plastic and extends continuously within the valve housing to define a plurality of spaced-apart pressure fluid compartments in fluid communication with the ports and to define the valve bore at least in a region which is positioned in the area of the pressure fluid compartments, with the valve bore interrupted in axial direction by the pressure fluid compartments wherein the outer housing portion is molded around the inner housing portion; and a slide member, accommodated in the valve bore of the valve housing for displacement in the direction of the axis, for regulating a flow of compressed air between the ports.

2. The slide valve of claim 1, wherein the valve housing has passageways, which extend between the pressure fluid compartments and the ports and are formed, at least partially, by the inner housing portion, whereby the ports and the pressure fluid compartments are placed into one-to-one correspondence.

3. The slide valve of claim 1, wherein the inner housing portion has opposite end faces which are each constructed to form a protrusion of slighter material thickness for improving a connection between the inner and outer housing portions, when the outer housing portion is molded around the inner housing portion.

4. The slide valve of claim 3, wherein each of the end faces is inwardly recessed.

5. The slide valve of claim 1, wherein the inner housing portion has an outer surface which is molded in the outer housing portion and formed with protuberances of reduced material thickness for enhancing a material union with the outer housing portion.

6. The slide valve of claim 5, wherein the protuberances are configured as spikes or lugs.

7. The gate valve of claim 5, wherein the protuberances taper at an angle of 25° to 35° so as to ensure a stable form-fitting engagement between the inner and outer housing portions in combination with the material union.

8. The slide valve of claim 1, wherein the inner housing portion is made of polyamide.

9. The slide valve of claim 1, wherein the outer housing portion is made of polyamide reinforced by 30 to 60% glass fibers.

10. The slide valve of claim 1, wherein the outer housing portion is made of polyamide reinforced by 50% glass fibers.

11. The slide valve of claim 1, wherein the slide member has sealing rings, said inner housing portion having sections which are disposed in adjacent relationship to the pressure fluid compartments to define the region of the valve bore positioned in the area of the pressure fluid compartments, and which are formed with at least one member selected from the group consisting of slanted run-on surfaces and curved run-on surfaces, with the member interacting with the sealing rings of the slide member.

12. The slide valve of claim 1, wherein the sliding member has sealing rings in axial direction, thereby defining two outermost sealing rings for sealing outermost ones of the pressure fluid compartments in relation to the valve housing by interacting with corresponding sections of the valve bore which are formed in the outer housing portion.

13. The slide valve of claim 1, wherein the inner housing portion interact with the outer housing portion via at least one radially outwardly located annular form-fitting joint.

14. The slide valve of claim 13, wherein the inner housing portion has at least one annular recess for form-fitting engagement with a complementary protuberance of the outer housing portion.

15. The slide valve of claim 13, wherein the inner housing portion has at least one annular protuberance for form-fitting engagement with a complementary recess of the outer housing portion.

16. The slide valve of claim 1, and further comprising a plate-shaped manifold constructed for distributing compressed air, said valve housing being mounted to the manifold by a screw connection, wherein the screw connection includes a screw fastener received in a through bore of the outer housing portion.

17. The slide valve of claim 1, wherein the valve housing includes a pilot chamber, and further comprising at least one pilot valve, mounted to the outer housing portion, for axial displacement of the slide member, whereby the pilot valve directs a control pressure in the pilot chamber of the valve housing.

18. The slide valve of claim 17, and further comprising at least one cap element for sealing the valve bore on at least one end side and defining the pilot chamber at the outer housing portion.

* * * * *